(12) United States Patent
Noh et al.

(10) Patent No.: US 9,133,914 B2
(45) Date of Patent: Sep. 15, 2015

(54) PLANETARY GEAR TRAIN OF AUTOMATIC TRANSMISSION FOR VEHICLE

(71) Applicant: Hyundai Motor Company, Seoul (KR)

(72) Inventors: Myonghoon Noh, Seongnam-si (KR); Kangsoo Seo, Yongin-si (KR); Jae Chang Kook, Hwaseong-si (KR); Hyu Tae Shim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 26 days.

(21) Appl. No.: 14/071,472

(22) Filed: Nov. 4, 2013

(65) Prior Publication Data

US 2014/0128210 A1    May 8, 2014

(30) Foreign Application Priority Data

Nov. 5, 2012  (KR) .......................... 10-2012-0124116

(51) Int. Cl.
*F16H 3/62*       (2006.01)
*F16H 3/66*       (2006.01)

(52) U.S. Cl.
CPC .................. *F16H 3/62* (2013.01); *F16H 3/666* (2013.01); *F16H 2200/006* (2013.01); *F16H 2200/201* (2013.01); *F16H 2200/2043* (2013.01)

(58) Field of Classification Search
CPC ................ F16H 3/62; F16H 2003/442; F16H 2003/445; F16H 2003/447; F16H 2200/006; F16H 2200/0082; F16H 2200/201; F16H 2200/2007; F16H 2200/2043
See application file for complete search history.

(56) References Cited

U.S. PATENT DOCUMENTS

| | | | |
|---|---|---|---|
| 7,819,772 B2 | 10/2010 | Tenberge | |
| 7,824,303 B2 | 11/2010 | Wittkopp et al. | |
| 8,038,568 B2 * | 10/2011 | Wittkopp et al. | 475/302 |
| 8,066,612 B2 * | 11/2011 | Phillips et al. | 475/302 |
| 8,157,688 B2 * | 4/2012 | Wittkopp et al. | 475/15 |
| 8,226,512 B2 | 7/2012 | Wittkopp et al. | |
| 2014/0162833 A1 * | 6/2014 | Noh et al. | 475/311 |

FOREIGN PATENT DOCUMENTS

KR     10-1063500 B1     9/2011

* cited by examiner

*Primary Examiner* — Robert Hodge
*Assistant Examiner* — Tinh Dang
(74) *Attorney, Agent, or Firm* — Morgan, Lewis & Bockius LLP

(57) ABSTRACT

A planetary gear train may include a first shaft receiving torque of an engine, a second shaft selectively connected to the first shaft through an externally-meshed gear, a first planetary gear set disposed on the first shaft, and including a first rotation element selectively operated as a fixed element, a second rotation element directly connected to the first shaft, and a third rotation element, a compound planetary gear set including a fourth rotation element selectively connected to the third rotation element through an externally-meshed gear, a fifth rotation element selectively connected to the first rotation element through an externally-meshed gear, a sixth rotation element directly connected to an output gear, and a seventh rotation element directly connected to the second shaft and selectively connected to the third rotation element through an externally-meshed gear, and frictional elements selectively connecting the rotation elements with each other or with a transmission housing.

6 Claims, 11 Drawing Sheets

FIG. 2

|     | B1 | C1 | C2 | C3 | C4 | gear ratio |
|-----|----|----|----|----|----|------------|
| 1ST | ● | ● | ● |   |   | 4.059 |
| 2ND | ● | ● |   |   | ● | 2.875 |
| 3RD |   | ● | ● |   | ● | 1.816 |
| 4TH |   | ● |   | ● | ● | 1.375 |
| 5TH |   | ● | ● | ● |   | 1.094 |
| 6TH |   |   | ● | ● | ● | 0.882 |
| 7TH | ● |   | ● | ● |   | 0.759 |
| 8TH | ● |   |   | ● | ● | 0.625 |
| REV | ● | ● |   | ● |   | -2.825 |

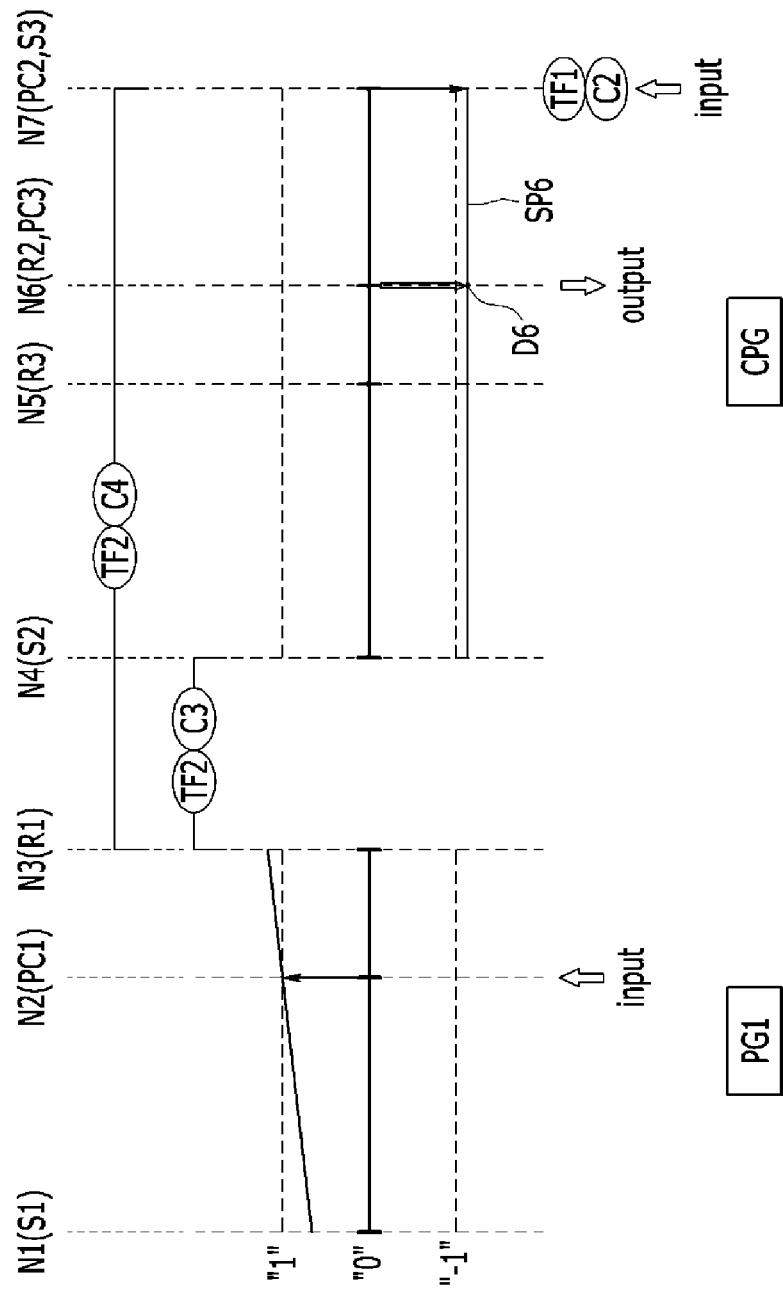

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2012-0124116 filed on Nov. 5, 2012, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for a vehicle that can improve mountability by reducing a length thereof and reduce fuel consumption by improving power delivery performance.

2. Description of Related Art

Recently, vehicle makers direct all their strength to improve fuel economy due to worldwide high oil prices and strengthen of exhaust gas regulations.

Improvement of fuel economy may be achieved by multi-shift mechanism realizing greater number of shift speeds in an automatic transmission. Typically, a planetary gear train is realized by combining a plurality of planetary gear sets and friction elements.

It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving mountability by minimizing a length thereof and reducing fuel consumption by improving power delivery performance as a consequence of achieving eight forward speeds and one reverse speed having excellent operating conditions and step ratios by combining three planetary gear sets separately arranged on first shaft and a second shaft disposed in parallel with each other, three externally-meshed gears and five frictional elements.

In an aspect of the present invention, a planetary gear train of an automatic transmission for a vehicle may include a first shaft receiving torque of an engine, a second shaft disposed in parallel with the first shaft and selectively connected to the first shaft through an externally-meshed gear, a first planetary gear set disposed on the first shaft, and including a first rotation element selectively operated as a fixed element, a second rotation element directly connected to the first shaft so as to be operated as an input element, and a third rotation element, a compound planetary gear set formed by combining a second planetary gear set and a third planetary gear set, and including a fourth rotation element selectively connected to the third rotation element through an externally-meshed gear, a fifth rotation element selectively connected to the first rotation element through an externally-meshed gear, a sixth rotation element directly connected to an output gear so as to be always operated as an output element, and a seventh rotation element directly connected to the second shaft and selectively connected to the third rotation element through an externally-meshed gear, three transfer gears forming the externally-meshed gears, and frictional elements selectively connecting the rotation elements with each other or with a transmission housing.

The first planetary gear set is a single pinion planetary gear set including a first sun gear, a first planet carrier, and a first ring gear as rotation elements thereof, the second planetary gear set is a double pinion planetary gear set including a second sun gear, a second planet carrier, and a second ring gear as rotation elements thereof, and the third planetary gear set is a single pinion planetary gear set including a third sun gear, a third planet carrier, and a third ring gear as rotation elements thereof.

The first rotation element may include the first sun gear, the second rotation element may include the first planet carrier, the third rotation element may include the first ring gear, the fourth rotation element may include the second sun gear, the fifth rotation element may include the third ring gear, the sixth rotation element may include the second ring gear and the third planet carrier, and the seventh rotation element may include the second planet carrier and the third sun gear.

The planetary gear train may further include a transfer gear connecting the first rotation element to the fifth rotation element.

The three transfer gears may include a first transfer gear connecting the first shaft to the second shaft, and a second transfer gear connecting the third rotation element to the fourth rotation element or the seventh rotation element.

The planetary gear train may further include a transfer gear connecting the first rotation element to the fifth rotation element, wherein the frictional elements may include a first clutch connected between the first rotation element and the third transfer gear, a second clutch connected between the first shaft and the first transfer gear, a third clutch connected between the second transfer gear and the fourth rotation element, a fourth clutch connected between the second transfer gear and the seventh rotation element, and a first brake connected between the first rotation element and the transmission housing.

The first brake and the first and second clutches are operated at a first forward speed, the first brake and the first and fourth clutches are operated at a second forward speed, the first, second, and fourth clutches are operated at a third forward speed, the first, third, and fourth clutches are operated at a fourth forward speed, the first, second, and third clutches are operated at a fifth forward speed, the second, third, and fourth clutches are operated at a sixth forward speed, the first brake and the second and third clutches are operated at a seventh forward speed, the first brake and the third and fourth clutches are operated at an eighth forward speed, and the first brake and the first and third clutches are operated at a reverse speed.

In another aspect of the present invention, a planetary gear train of an automatic transmission for a vehicle, may include a first shaft receiving torque of an engine, a second shaft disposed in parallel with the first shaft and selectively connected to the first shaft, a first planetary gear set disposed on the first shaft, and including a first rotation element selectively operated as a fixed element, a second rotation element directly connected to the first shaft so as to be operated as an input element, and a third rotation element, a compound planetary gear set formed by combining a second planetary gear set and a third planetary gear set, and including a fourth rotation element selectively connected to the third rotation element, a fifth rotation element selectively connected to the first rotation element, a sixth rotation element directly connected to an output gear so as to be always operated as an output element, and a seventh rotation element directly connected to the second shaft and selectively connected to the third rotation element, a first transfer gear connecting the first shaft to the second shaft, a second transfer gear connecting the third rotation element to the fourth rotation element or the seventh rotation element, a third transfer gear connecting the first rotation element to the fifth rotation element, a first clutch connected between the first rotation element and the third transfer gear, a second clutch connected between the first shaft and the first transfer gear, a third clutch connected between the second transfer gear and the fourth rotation element, a fourth clutch connected between the second transfer gear and the seventh rotation element, and a first brake connected between the first rotation element and a transmission housing.

The first planetary gear set is a single pinion planetary gear set including a first sun gear, a first planet carrier, and a first ring gear as rotation elements thereof, the second planetary gear set is a double pinion planetary gear set including a second sun gear, a second planet carrier, and a second ring gear as rotation elements thereof, and the third planetary gear set is a single pinion planetary gear set including a third sun gear, a third planet carrier, and a third ring gear as rotation elements thereof.

The first rotation element may include the first sun gear, the second rotation element may include the first planet carrier, the third rotation element may include the first ring gear, the fourth rotation element may include the second sun gear, the fifth rotation element may include the third ring gear, the sixth rotation element may include the second ring gear and the third planet carrier, and the seventh rotation element may include the second planet carrier and the third sun gear.

The first brake and the first and second clutches are operated at a first forward speed, the first brake and the first and fourth clutches are operated at a second forward speed, the first, second, and fourth clutches are operated at a third forward speed, the first, third, and fourth clutches are operated at a fourth forward speed, the first, second, and third clutches are operated at a fifth forward speed, the second, third, and fourth clutches are operated at a sixth forward speed, the first brake and the second and third clutches are operated at a seventh forward speed, the first brake and the third and fourth clutches are operated at an eighth forward speed, and the first brake and the first and third clutches are operated at a reverse speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction elements at each shift-speed applied to a planetary gear train according to an exemplary embodiment of the present invention.

FIG. 3F is a lever diagram of a planetary gear train at the sixth forward speed according to an exemplary embodiment of the present invention.

Figure 1:
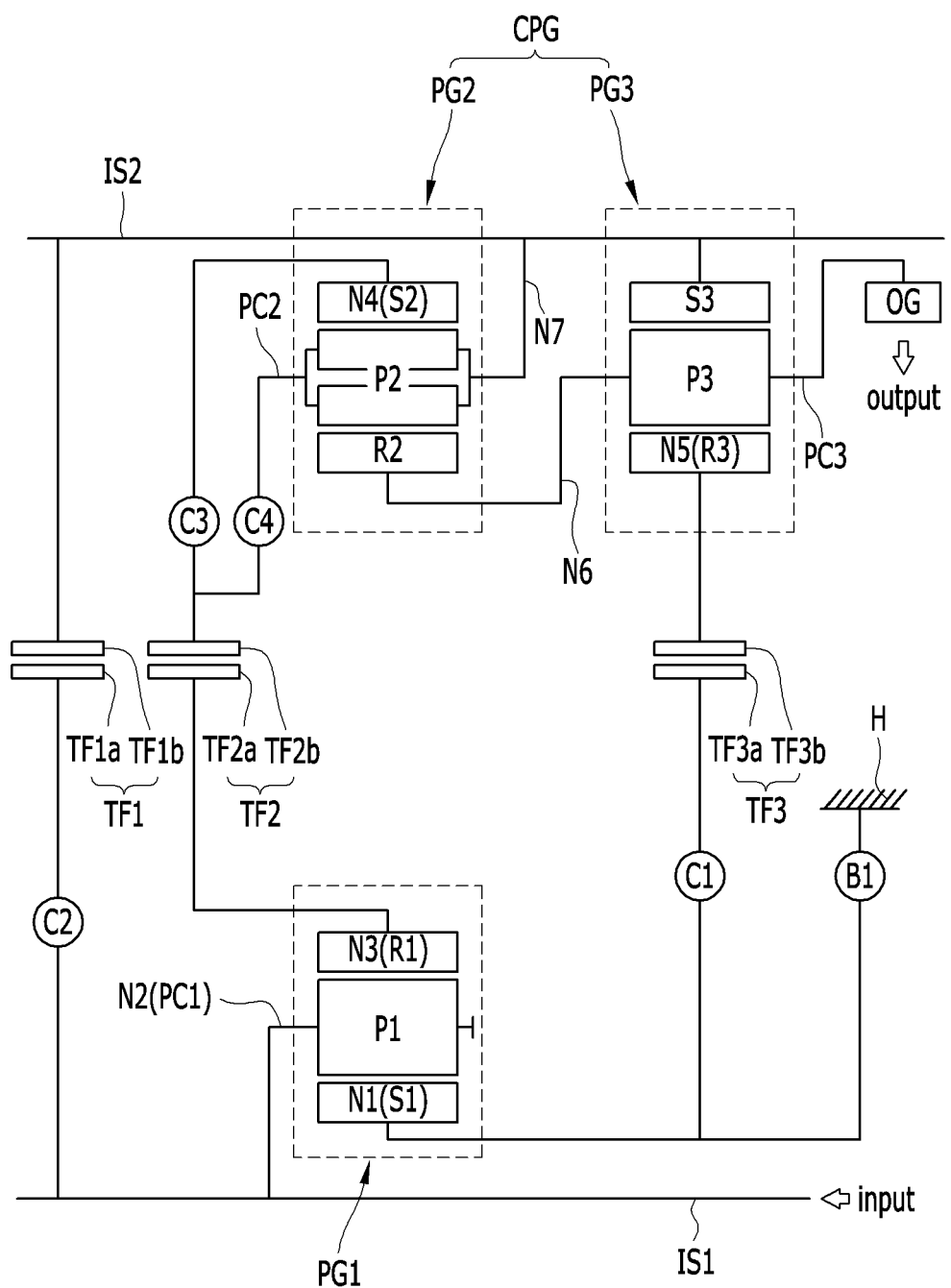
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to an exemplary embodiment of the present invention.

Referring to FIG. 1, a planetary gear train according to an exemplary embodiment of the present invention includes first, second, and third planetary gear sets PG1, PG2, and PG3, five frictional elements B1, C1, C2, C3, and C4, and three transfer gears TF1, TF2, and TF3.

The first planetary gear set PG1 is disposed on a first shaft IS1, and the second and third planetary gear sets PG2 and PG3 are disposed on a second shaft IS2 disposed in parallel with the first shaft IS1

The first shaft IS1 is an input member, supports the first planetary gear set PG1, and transmits torque from an engine to the first planetary gear set PG1.

The second shaft IS2 supports the second and third planetary gear sets PG2 and PG3, and transmits torque selectively transmitted from the first shaft IS1 and the first planetary gear set PG1 to the second and third planetary gear sets PG2 and PG3.

Therefore, torque input from the first shaft IS1 is converted into eight forward speeds and one reverse speed by cooperation of the first, second, and third planetary gear sets PG1, PG2, and PG3, and then is output through an output gear OG.

The first planetary gear set PG1 is a single pinion planetary gear set, and includes a first sun gear S1, a first ring gear R1, and a first planet carrier PC1 rotatably supporting a first pinion P1 engaged to the first sun gear S1 and the first ring gear R1 as rotation elements thereof.

The second planetary gear set PG2 is a double pinion planetary gear set, and includes a second sun gear S2, a second ring gear R2, and a second planet carrier PC2 rotatably supporting a second pinion P2 engaged to the second sun gear S2 and the second ring gear R2 as rotation elements thereof.

The third planetary gear set PG3 is a single pinion planetary gear set, and includes a third sun gear S3, a third ring gear R3, and a third planet carrier PC3 rotatably supporting a third pinion P3 engaged to the third sun gear S3 and the third ring gear R3 as rotation elements thereof.

The first planetary gear set PG1 is operated independently, and the second and third planetary gear sets PG2 and PG3 are operated as a compound planetary gear set CPG.

Therefore, the first planetary gear set PG1 includes three rotation elements N1, N2, and N3.

The first rotation element N1 includes the first sun gear S1, and is selectively connected to a transmission housing H so as to be operated as a selective fixed element.

The second rotation element N2 includes the first planet carrier PC1, and is directly connected to the first shaft IS1 so as to be always operated as an input element.

The third rotation element N3 includes the first ring gear R1.

In addition, the second ring gear R2 is directly connected to the third planet carrier PC3 and the second planet carrier PC2 is directly connected to the third sun gear S3 such that the second and third planetary gear sets PG2 and PG3 form one compound planetary gear set CPG. Therefore, the compound planetary gear set CPG includes four rotation elements N4, N5, N6, and N7.

The fourth rotation element N4 includes the second sun gear S2, and selectively receives torque of the third rotation element N3 as an inverse rotation speed.

The fifth rotation element N5 includes the third ring gear R3, and selectively receives torque of the first rotation element N1 as an inverse rotation speed.

The sixth rotation element N6 includes the second ring gear R2 and the third planet carrier PC3, and is connected to the output gear OG so as to be operated as a final output element.

The seventh rotation element N7 includes the second planet carrier PC2 and the third sun gear S3, and is directly connected to the second shaft IS2 so as to selectively receive torque from the first shaft IS1 and the third rotation element N3 as an inverse rotation speed.

In addition, the rotation elements N1, N2, N3, N4, N5, N6, and N7 are combined to each other by the first, second, and third transfer gears TF1, TF2, and TF3 and the frictional elements including the first brake B1 and the first, second, third, and fourth clutches C1, C2, C3, and C4.

The first, second, and third transfer gears TF1, TF2, and TF3 are externally-meshed gears, and respectively have first, second, and third transfer drive gears TF1a, TF2a, and TF3a and first, second, and third transfer driven gears TF1b, TF2b, and TF3b externally meshed with each other.

The first transfer gear TF1 connects the first shaft IS1 with the second shaft IS2.

The second transfer gear TF2 connects the third rotation element N3 with the fourth rotation element N4 and the seventh rotation element N7.

The third transfer gear TF3 connects the first rotation element N1 with the fifth rotation element N5.

Therefore, the rotation elements (including the first shaft IS1 and the second shaft IS2) connected through the first, second, and third transfer gears TF1, TF2, and TF3 are rotated in opposite directions. Gear ratios of the first, second, and third transfer gears TF1, TF2, and TF3 are set according to speed ratios needed at each shift-speed.

In addition, arrangement of the frictional elements B1, C1, C2, C3, and C4 will be described.

The first brake B1 is disposed between the first rotation element N1 and the transmission housing H.

The first clutch C1 is disposed between the first rotation element N1 and the third transfer gear TF3.

The second clutch C2 is disposed between the first shaft IS1 and the first transfer gear TF1.

The third clutch C3 is disposed between the second transfer gear TF2 and the fourth rotation element N4.

The fourth clutch C4 is disposed between the second transfer gear TF2 and the seventh rotation element N7.

The frictional elements including the first, second, third, and fourth clutches C1, C2, C3, and C4 and the first brake B1 are conventional multi-plate friction elements of wet type that are operated by hydraulic pressure.

FIG. 2 is an operational chart of friction elements at each shift-speed applied to a planetary gear train according to an exemplary embodiment of the present invention.

As shown in FIG. 2, three frictional elements are operated at each shift-speed in the planetary gear train according to the exemplary embodiment of the present invention.

The first brake B1 and the first and second clutches C1 and C2 are operated at a first forward speed 1ST.

The first brake B1 and the first and fourth clutches C1 and C4 are operated at a second forward speed 2ND.

The first, second, and fourth clutches C1, C2, and C4 are operated at a third forward speed 3RD.

The first, third, and fourth clutches C1, C3, and C4 are operated at a fourth forward speed 4TH.

The first, second, and third clutches C1, C2, and C3 are operated at a fifth forward speed 5TH.

The second, third, and fourth clutches C2, C3, and C4 are operated at a sixth forward speed 6TH.

The first brake B1 and the second and third clutches C2 and C3 are operated at a seventh forward speed 7TH.

The first brake B1 and the third and fourth clutches C3 and C4 are operated at an eighth forward speed 8TH.

The first brake B1 and the first and third clutches C1 and C3 are operated at a reverse speed REV.

FIG. 3A to FIG. 3I are lever diagrams of the planetary gear train according to the exemplary embodiment of the present invention, and illustrate shift processes of the planetary gear train according to the exemplary embodiment of the present invention by lever analysis method.

Referring to FIG. 3A to FIG. 3I, three vertical lines of the first planetary gear set PG1 are set as the first rotation element N1, the second rotation element N2, the third rotation element N3, and four vertical lines of the compound planetary gear set CPG are set as the fourth rotation element N4, the fifth rotation element N5, the sixth rotation element N6, and the seventh rotation element N7.

In addition, a middle horizontal line represents a rotation speed of "0", an upper horizontal line represents a positive rotation speed and a lower horizontal line represents a negative rotation speed.

"-" means that the rotation elements are rotated in an opposite direction to the rotation direction of the engine. It is because the second shaft IS2 and the rotation elements of the compound planetary gear set CPG are externally meshed to the first shaft IS1 and the rotation elements of the first planetary gear set PG1 through the first, second, and third transfer gears TF1, TF2, and TF3 without an idling gear.

In addition, distances between the vertical lines are set according to gear ratios (teeth number of sun gear/teeth number of ring gear) of the first, second, and third planetary gear sets PG1, PG2, and PG3.

Hereinafter, referring to FIG. 2 and FIG. 3A to FIG. 3I, the shift processes of the planetary gear train according to the exemplary embodiment of the present invention will be described in detail.

[First Forward Speed]

Referring to FIG. 2, the first brake B1 and the first and second clutches C1 and C2 are operated at the first forward speed 1ST.

Figure 3A:
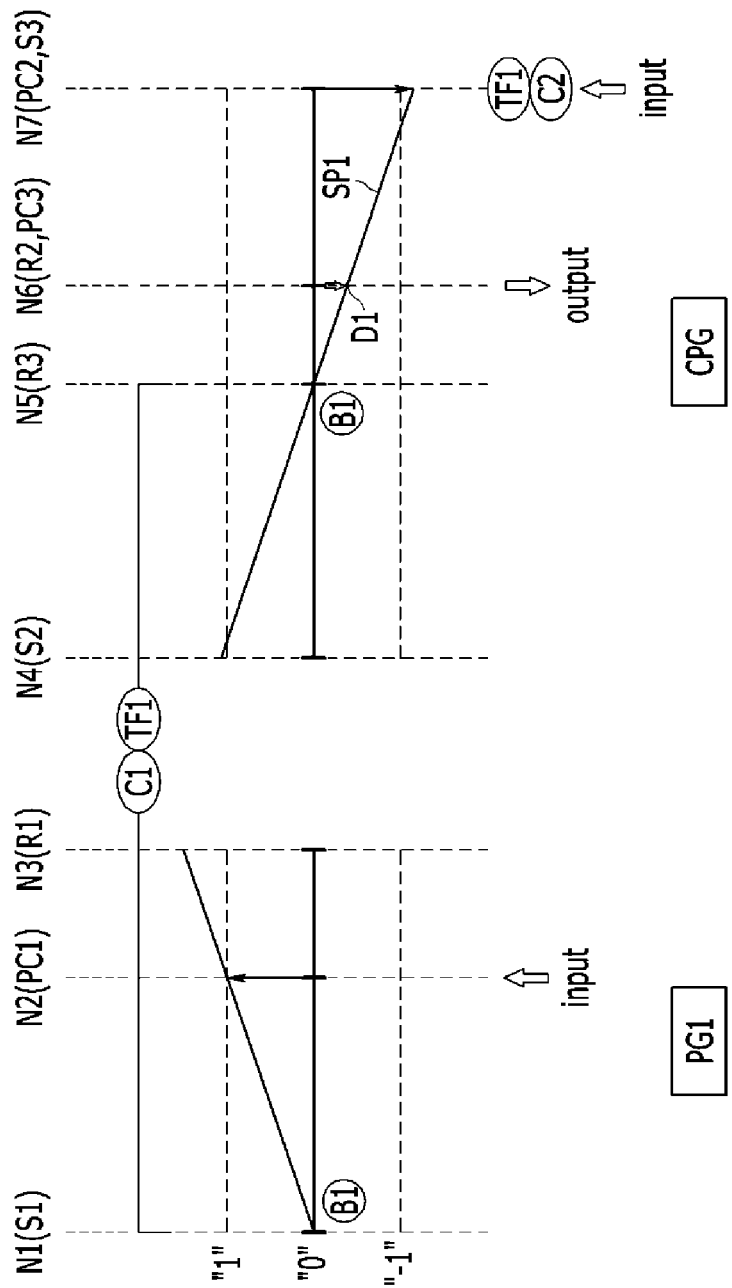
FIG. 3A is a lever diagram of a planetary gear train at the first forward speed according to an exemplary embodiment of the present invention.

As shown in FIG. 3A, the torque of the first shaft IS1 is input to the second rotation element N2, and is changed according to the gear ratio of the first transfer gear TF1 and is input to the seventh rotation element N7 as an inverse rotation speed by operation of the second clutch C2.

At this state, the first rotation element N1 and the fifth rotation element N5 are operated as the fixed elements by operation of the first brake B1 and the first clutch Therefore, the rotation elements of the compound planetary gear set CPG form a first shift line SP1 and D1 is output through the sixth rotation element N6 that is the output element.

[Second Forward Speed]

The second clutch C2 that was operated at the first forward speed 1ST is released and the fourth clutch C4 is operated at the second forward speed 2ND.

Figure 3B:
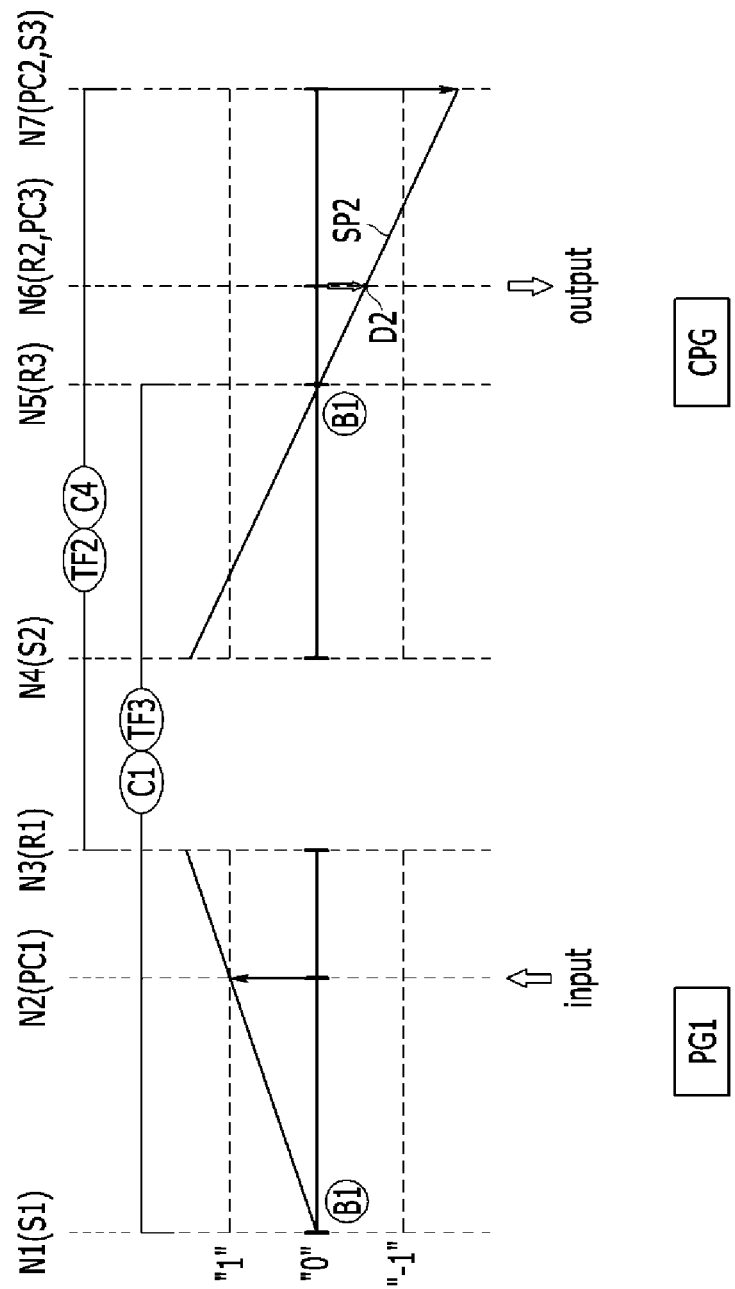
FIG. 3B is a lever diagram of a planetary gear train at the second forward speed according to an exemplary embodiment of the present invention.

As shown in FIG. 3B, the torque of the first shaft IS1 is input to the second rotation element N2, and the first rotation element N1 and the fifth rotation element N5 are operated as the fixed elements by operation of the first brake B1 and the first clutch C1.

In addition, the third rotation element N3 is connected to the seventh rotation element N7 through the second transfer gear TF2 by operation of the fourth clutch C4. Therefore, the rotation elements of the compound planetary gear set CPG form a second shift line SP2 by cooperation of the first planetary gear set PG1 and the compound planetary gear set CPG and D2 is output through the sixth rotation element N6 that is the output element.

[Third Forward Speed]

The first brake B1 that was operated at the second forward speed 2ND is released and the second clutch C2 is operated at the third forward speed 3RD.

Figure 3C:
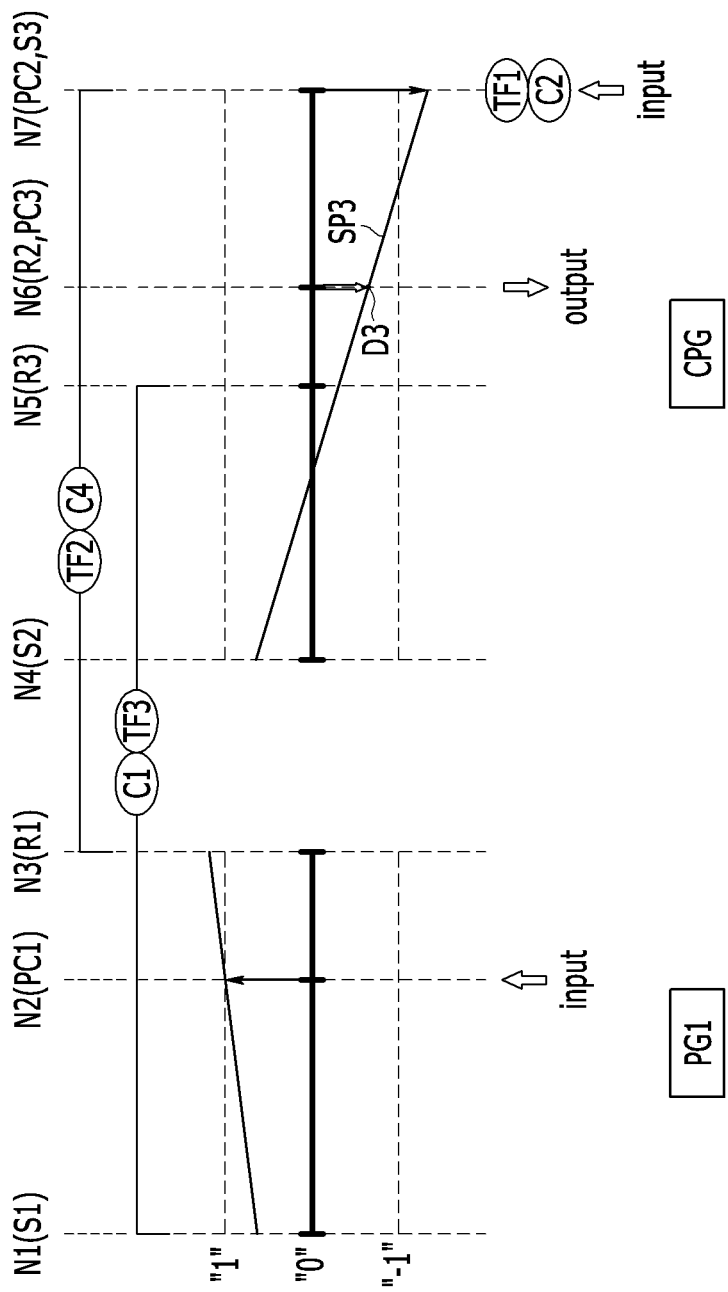
FIG. 3C is a lever diagram of a planetary gear train at the third forward speed according to an exemplary embodiment of the present invention.

As shown in FIG. 3C, the torque of the first shaft IS1 is input to the second rotation element N2, and is changed according to the gear ratio of the first transfer gear TF1 and is then input to the seventh rotation element N7 as the inverse rotation speed by operation of the second clutch C2.

In addition, the first rotation element N1 is connected to the fifth rotation element N5 through the third transfer gear TF3 by operation of the first clutch C1, and the third rotation element N3 is connected to the seventh rotation element N7 through the second transfer gear TF2 by operation of the fourth clutch C4.

Therefore, the rotation elements of the compound planetary gear set CPG form a third shift line SP3 by cooperation of the first planetary gear set PG1 and the compound planetary gear set CPG, and D3 is output through the sixth rotation element N6 that is the output element.

[Fourth Forward Speed]

The second clutch C2 that was operated at the third forward speed 3RD is released and the third clutch C3 is operated at the fourth forward speed 4TH.

Figure 3D:
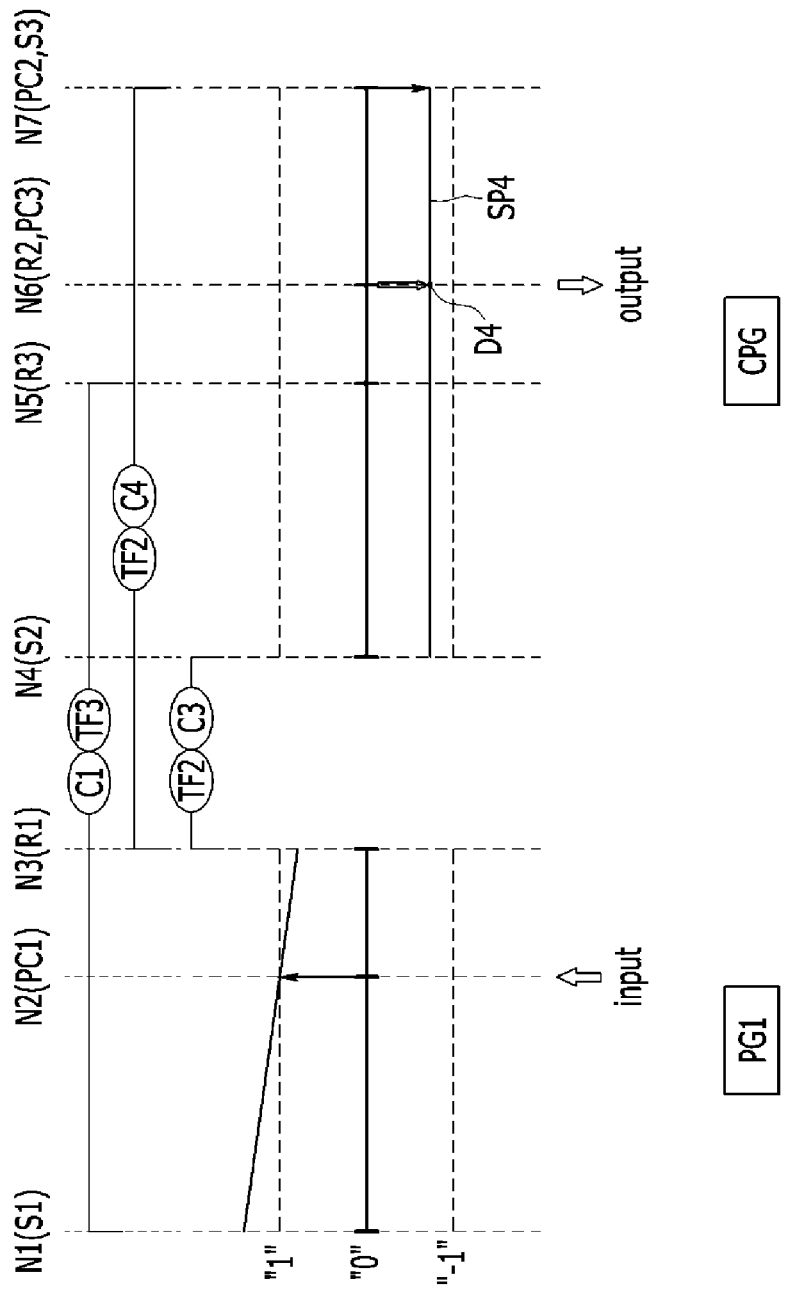
FIG. 3D is a lever diagram of a planetary gear train at the fourth forward speed according to an exemplary embodiment of the present invention.

As shown in FIG. 3D, the torque of the first shaft IS1 is input to the second rotation element N2, the first rotation element N1 is connected to the fifth rotation element N5 through the third transfer gear TF3 by operation of the first clutch C1, and the third rotation element N3 is connected to the fourth rotation element N4 through the second transfer gear TF2 by operation of the third clutch C3 and is connected to the seventh rotation element N7 through the second transfer gear TF2 by operation of the fourth clutch C4.

Therefore, the rotation elements of the compound planetary gear set CPG form a fourth shift line SP4 by cooperation of the first planetary gear set PG1 and the compound planetary gear set CPG, and D4 is output through the sixth rotation element N6 that is the output element.

[Fifth Forward Speed]

The fourth clutch C4 that was operated at the fourth forward speed 4TH is released and the second clutch C2 is operated at the fifth forward speed 5TH.

Figure 3E:
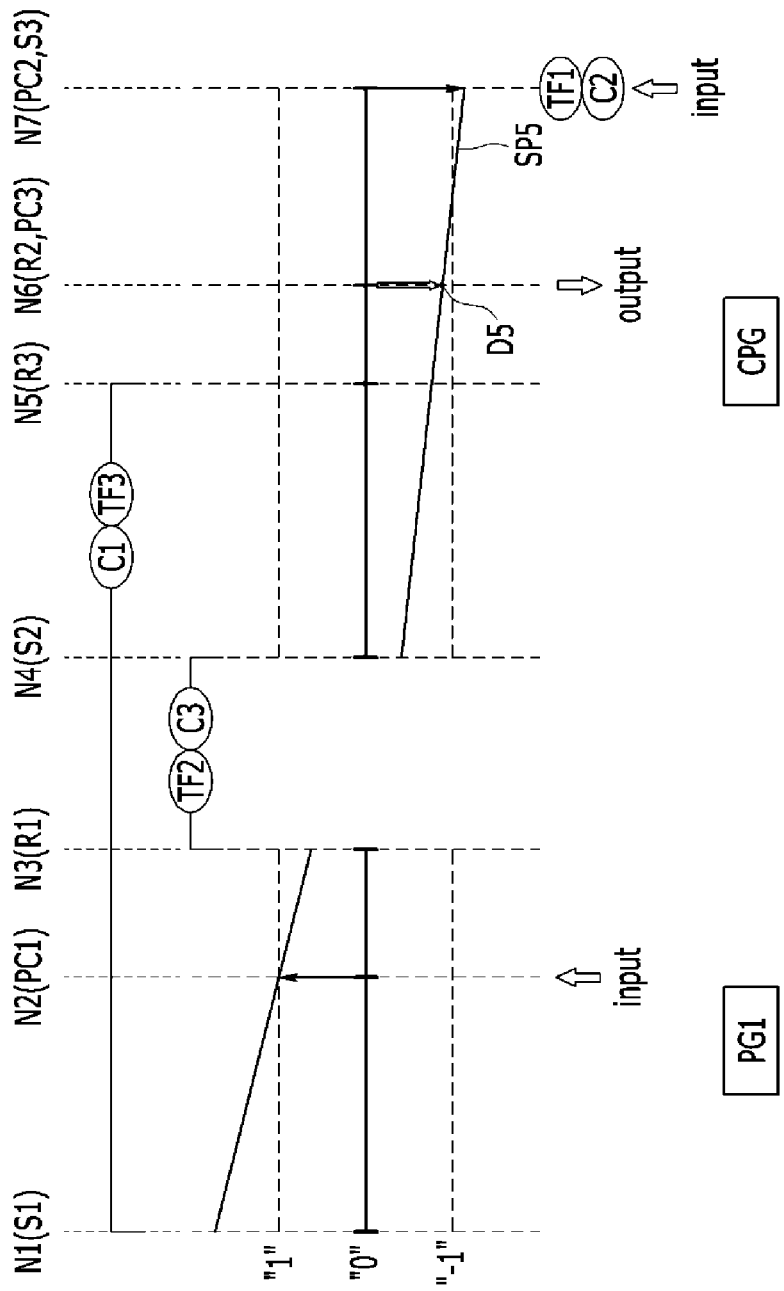
FIG. 3E is a lever diagram of a planetary gear train at the fifth forward speed according to an exemplary embodiment of the present invention.

As shown in FIG. 3E, the torque of the first shaft IS1 is input to the second rotation element N2, and is changed according to the gear ratio of the first transfer gear TF1 and is then input to the seventh rotation element N7 as the inverse rotation speed by operation of the second clutch C2.

In addition, the first rotation element N1 is connected to the fifth rotation element N5 through the third transfer gear TF3 by operation of the first clutch C1, and the third rotation element N3 is connected to the fourth rotation element N4 through the second transfer gear TF2 by operation of the third clutch C3.

Therefore, the rotation elements of the compound planetary gear set CPG form a fifth shift line SP5 by cooperation of the first planetary gear set PG1 and the compound planetary gear set CPG, and D5 is output through the sixth rotation element N6 that is the output element.

[Sixth Forward Speed]

The first clutch C1 that was operated at the fifth forward speed 5TH is released and the fourth clutch C4 is operated at the sixth forward speed 6TH.

As shown in FIG. 3F, the torque of the first shaft IS1 is input to the second rotation element N2, and is changed according to the gear ratio of the first transfer gear TF1 and is then input to the seventh rotation element N7 as the inverse rotation speed by operation of the second clutch C2.

In addition, the third rotation element N3 is connected to the fourth rotation element N4 through the second transfer gear TF2 by operation of the third clutch C3 and is connected to the seventh rotation element N7 through the second transfer gear TF2 by operation of the fourth clutch C4.

Therefore, the compound planetary gear set CPG becomes a direct-coupling state, the rotation elements of the compound planetary gear set CPG form a sixth shift line SP6, and D6 is output through the sixth rotation element N6 that is the output element.

[Seventh Forward Speed]

The fourth clutch C4 that was operated at the sixth forward speed 6TH is released and the first brake B1 is operated at the seventh forward speed 7TH.

Figure 3G:
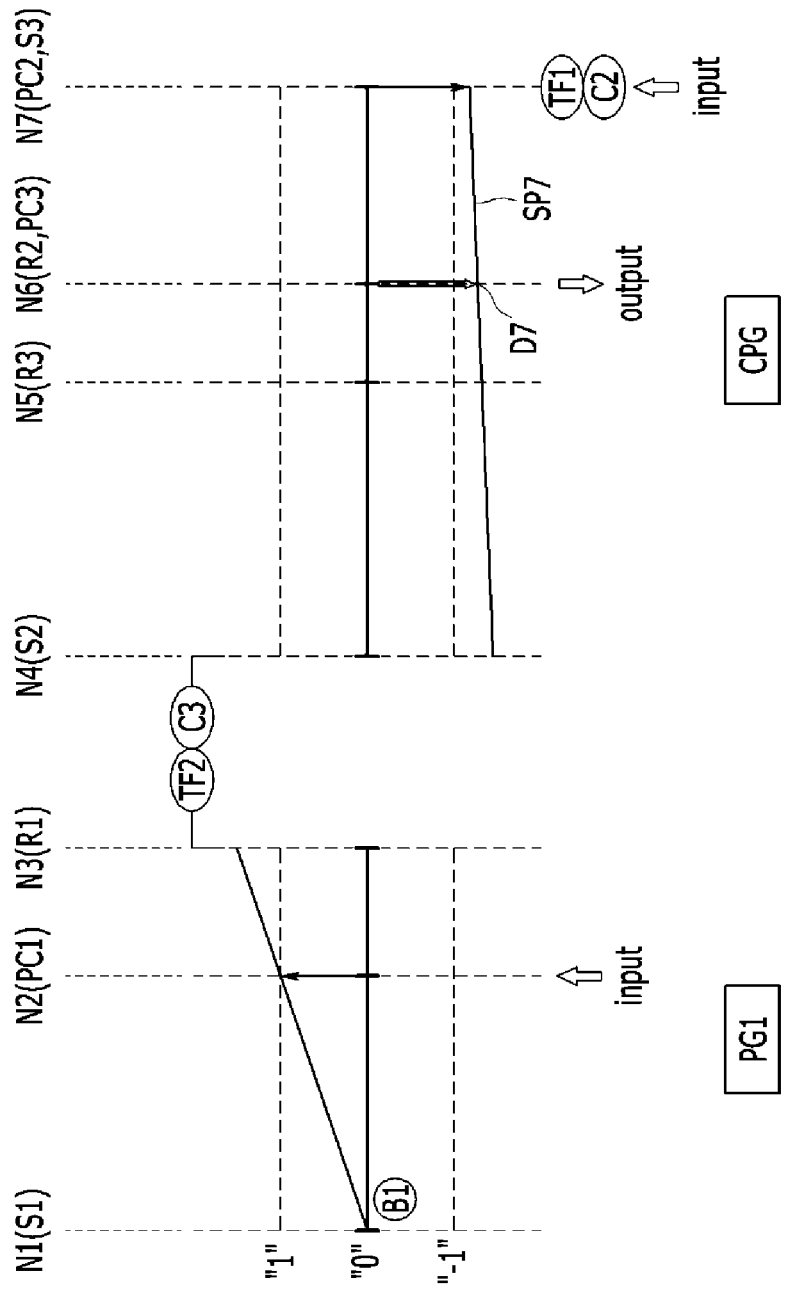
FIG. 3G is a lever diagram of a planetary gear train at the seventh forward speed according to an exemplary embodiment of the present invention.

As shown in FIG. 3G, the torque of the first shaft IS1 is input to the second rotation element N2, and is changed according to the gear ratio of the first transfer gear TF1 and is then input to the seventh rotation element N7 as the inverse rotation speed by operation of the second clutch C2.

At this state, the first rotation element N1 is operated as the fixed element by operation of the first brake B1, and the third rotation element N3 is connected to the fourth rotation element N4 through the second transfer gear TF2 by operation of the third clutch C3.

Therefore, the rotation elements of the compound planetary gear set CPG form a seventh shift line SP7 by cooperation of the first planetary gear set PG1 and the compound planetary gear set CPG, and D7 is output through the sixth rotation element N6 that is the output element.

[Eighth Forward Speed]

The second clutch C2 that was operated at the seventh forward speed 7TH is released and the fourth clutch C4 is operated at the eighth forward speed 8TH.

Figure 3H:
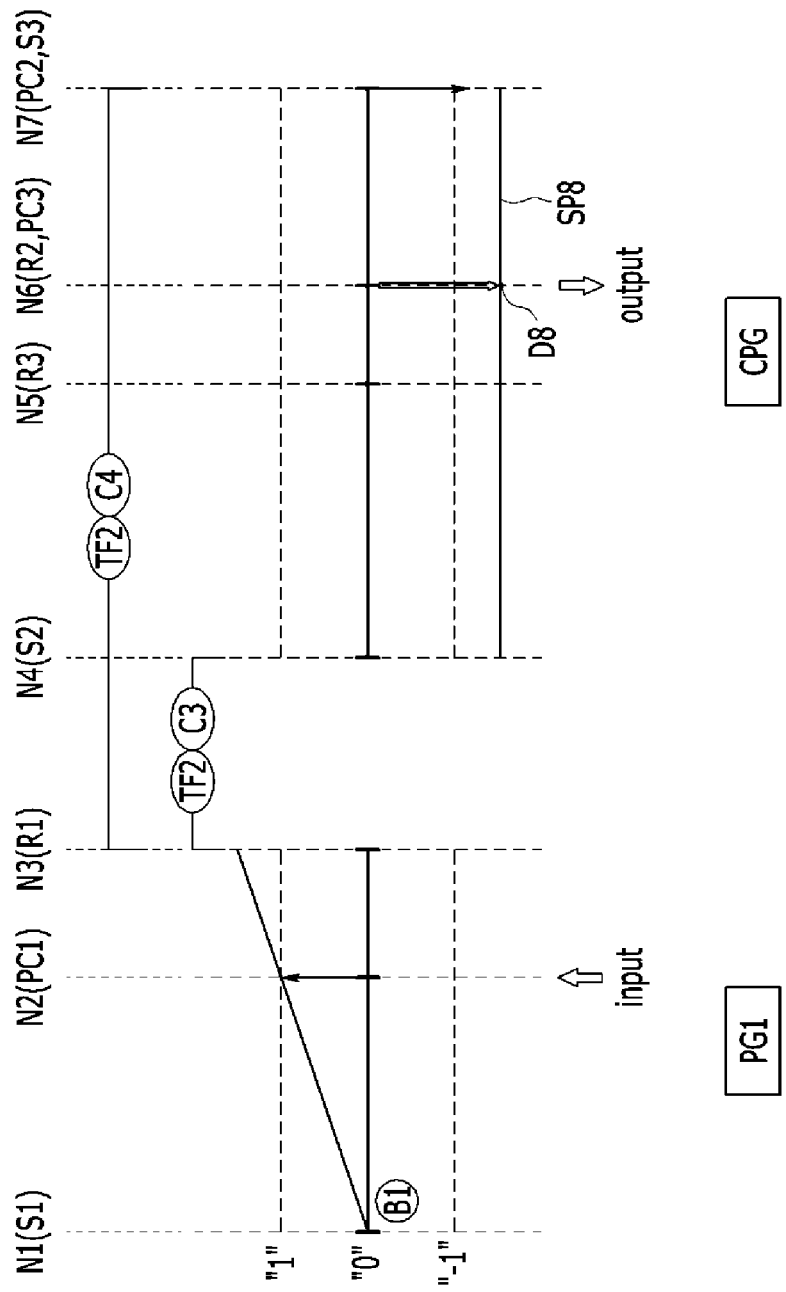
FIG. 3H is a lever diagram of a planetary gear train at the eighth forward speed according to an exemplary embodiment of the present invention.

As shown in FIG. 3H, the torque of the first shaft IS1 is input to the second rotation element N2, and the first rotation element N1 is operated as the fixed element by operation of the first brake B1.

In addition, the third rotation element N3 is connected to the fourth rotation element N4 through the second transfer gear TF2 by operation of the third clutch C3 and is connected to the seventh rotation element N7 through the second transfer gear TF2 by operation of the fourth clutch C4.

Therefore, the compound planetary gear set CPG becomes the direct-coupling state, the rotation element of the compound planetary gear set CPG form an eighth shift line SP8, and D8 is output through the sixth rotation element N6 that is the output element.

[Reverse Speed]

As shown in FIG. 2, the first brake B1 and the first and third clutches C1 and C3 are operated at the reverse speed REV.

Figure 3I:
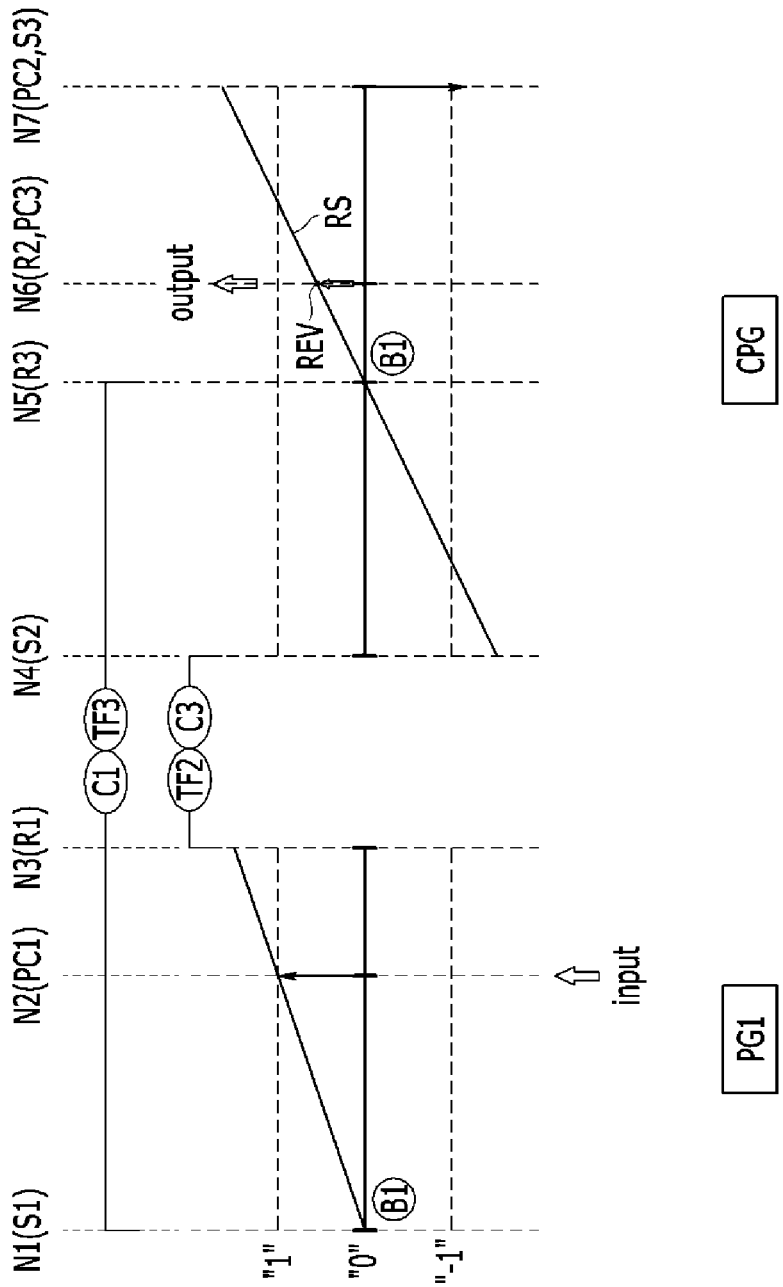
FIG. 3I is a lever diagram of a planetary gear train at a reverse speed according to an exemplary embodiment of the present invention.

As shown in FIG. 3I, the torque of the first shaft IS1 is input to the second rotation element N2, and the first rotation element N1 and the fifth rotation element N5 are operated as the fixed elements by operation of the first brake B1 and the first clutch C. In addition, the third rotation element N3 is connected to the fourth rotation element N4 through the second transfer gear TF2 by operation of the third clutch C3.

Therefore, the rotation elements of the compound planetary gear set CPG form a reverse shift line RS by cooperation of the first planetary gear set PG1 and the compound planetary gear set CPG, and REV is output through the sixth rotation element N6 that is the output element.

As described above, since three planetary gear sets are separately arranged on the first shaft and the second shaft disposed in parallel with each other, a length of the planetary gear train may be reduced and mountability maybe improved according to the exemplary embodiment of the present invention.

In addition, optimum gear ratios may be set due to ease of changing gear ratios by using three externally-meshed gears as well as the planetary gear sets. Since gear ratios can be changed according to target performance, starting performance, power delivery performance and fuel economy may be improved. Therefore, a start-up clutch instead of a torque converter may be used.

Since three frictional elements are operated at each shift-speed, non-operated frictional element may be minimized and drag torque may be reduced. In addition, fuel consumption may be reduced by increasing power delivery efficiency.

In addition, since torque load of each frictional element can be reduced, compact design is possible.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   a first shaft receiving torque of an engine;
   a second shaft disposed in parallel with the first shaft and selectively connected to the first shaft;
   a first planetary gear set disposed on the first shaft, and including a first rotation element selectively operated as a fixed element, a second rotation element directly connected to the first shaft so as to be operated as an input element, and a third rotation element;
   a compound planetary gear set formed by combining a second planetary gear set and a third planetary gear set, and including a fourth rotation element selectively connected to the third rotation element, a fifth rotation element selectively connected to the first rotation element, a sixth rotation element directly connected to an output gear so as to be always operated as an output element, and a seventh rotation element directly connected to the second shaft and selectively connected to the third rotation element;
   a first transfer gear connecting the first shaft to the second shaft;

a second transfer gear connecting the third rotation element to the fourth rotation element or the seventh rotation element;
a third transfer gear connecting the first rotation element to the fifth rotation element;
a first clutch connected between the first rotation element and the third transfer gear;
a second clutch connected between the first shaft and the first transfer gear;
a third clutch connected between the second transfer gear and the fourth rotation element;
a fourth clutch connected between the second transfer gear and the seventh rotation element; and
a first brake connected between the first rotation element and a transmission housing.

2. The planetary gear train of claim 1, wherein the first planetary gear set is a single pinion planetary gear set including a first sun gear, a first planet carrier, and a first ring gear as rotation elements thereof,
the second planetary gear set is a double pinion planetary gear set including a second sun gear, a second planet carrier, and a second ring gear as rotation elements thereof, and
the third planetary gear set is a single pinion planetary gear set including a third sun gear, a third planet carrier, and a third ring gear as rotation elements thereof.

3. The planetary gear train of claim 2, wherein the first rotation element includes the first sun gear,
the second rotation element includes the first planet carrier,
the third rotation element includes the first ring gear,
the fourth rotation element includes the second sun gear,
the fifth rotation element includes the third ring gear,
the sixth rotation element includes the second ring gear and the third planet carrier, and
the seventh rotation element includes the second planet carrier and the third sun gear.

4. The planetary gear train of claim 1, wherein the first brake and the first and second clutches are operated at a first forward speed,
the first brake and the first and fourth clutches are operated at a second forward speed,
the first, second, and fourth clutches are operated at a third forward speed,
the first, third, and fourth clutches are operated at a fourth forward speed,
the first, second, and third clutches are operated at a fifth forward speed,
the second, third, and fourth clutches are operated at a sixth forward speed,
the first brake and the second and third clutches are operated at a seventh forward speed,
the first brake and the third and fourth clutches are operated at an eighth forward speed, and
the first brake and the first and third clutches are operated at a reverse speed.

5. A planetary gear train of an automatic transmission for a vehicle, comprising:
a first shaft receiving torque of an engine;
a second shaft disposed in parallel with the first shaft and selectively connected to the first shaft through a first externally-meshed gear;
a first planetary gear set disposed on the first shaft, and including a first rotation element selectively operated as a fixed element, a second rotation element directly connected to the first shaft so as to be operated as an input element, and a third rotation element;
a compound planetary gear set formed by combining a second planetary gear set and a third planetary gear set, and including a fourth rotation element selectively connected to the third rotation element through a second externally-meshed gear, a fifth rotation element selectively connected to the first rotation element through a third externally-meshed gear, a sixth rotation element directly connected to an output gear so as to be always operated as an output element, and a seventh rotation element directly connected to the second shaft and selectively connected to the third rotation element through the second externally-meshed gear;
each of three transfer gears forming the first, second and third externally-meshed gears respectively;
frictional elements selectively connecting the first, second, third, fourth, fifth, sixth and seventh rotation elements with each other or with a transmission housing,
wherein the three transfer gears comprise:
a first transfer gear connecting the first shaft to the second shaft;
a second transfer gear connecting the third rotation element to the fourth rotation element or the seventh rotation element; and
a third transfer gear connecting the first rotation element to the fifth rotation element,
wherein the frictional elements comprise:
a first clutch connected between the first rotation element and the third transfer gear;
a second clutch connected between the first shaft and the first transfer gear;
a third clutch connected between the second transfer gear and the fourth rotation element;
a fourth clutch connected between the second transfer gear and the seventh rotation element; and
a first brake connected between the first rotation element and the transmission housing.

6. A planetary gear train of an automatic transmission for a vehicle, comprising:
a first shaft receiving torque of an engine;
a second shaft disposed in parallel with the first shaft and selectively connected to the first shaft through a first externally-meshed gear;
a first planetary gear set disposed on the first shaft, and including a first rotation element selectively operated as a fixed element, a second rotation element directly connected to the first shaft so as to be operated as an input element, and a third rotation element;
a compound planetary gear set formed by combining a second planetary gear set and a third planetary gear set, and including a fourth rotation element selectively connected to the third rotation element through a second externally-meshed gear, a fifth rotation element selectively connected to the first rotation element through a third externally-meshed gear, a sixth rotation element directly connected to an output gear so as to be always operated as an output element, and a seventh rotation element directly connected to the second shaft and selectively connected to the third rotation element through the second externally-meshed gear;
each of three transfer gears forming the first, second and third externally-meshed gears respectively;
frictional elements selectively connecting the first, second, third, fourth, fifth, sixth and seventh rotation elements with each other or with a transmission housing,
wherein the three transfer gears comprise:
a first transfer gear connecting the first shaft to the second shaft;

a second transfer gear connecting the third rotation element to the fourth rotation element or the seventh rotation element; and a third transfer gear connecting the first rotation element to the fifth rotation element, and wherein the first brake and the first and second clutches are operated at a first forward speed, the first brake and the first and fourth clutches are operated at a second forward speed, the first, second, and fourth clutches are operated at a third forward speed, the first, third, and fourth clutches are operated at a fourth forward speed, the first, second, and third clutches are operated at a fifth forward speed, the second, third, and fourth clutches are operated at a sixth forward speed, the first brake and the second and third clutches are operated at a seventh forward speed, the first brake and the third and fourth clutches are operated at an eighth forward speed, and the first brake and the first and third clutches are operated at a reverse speed.

* * * * *